United States Patent
Huard et al.

(10) Patent No.: US 11,110,759 B2
(45) Date of Patent: Sep. 7, 2021

(54) OPTIMISATION OF WIRELESS COMMUNICATIONS OF A TYRE-PRESSURE-MONITORING SYSTEM FOR A MOTOR VEHICLE

(71) Applicants: Continental Automotive France, Toulouse (FR); Continental Automotive GmbH, Hannover (DE)

(72) Inventors: Jean-Charles Huard, Toulouse (FR); Nicolas Guinart, Toulouse (FR); Jean-Philippe Boisset, Toulouse (FR)

(73) Assignees: Continental Automotive France, Toulouse (FR); Continental Automotive GmbH, Hannover (DE)

(*) Notice: Subject to any disclaimer, the term of this patent is extended or adjusted under 35 U.S.C. 154(b) by 0 days.

(21) Appl. No.: 17/263,240

(22) PCT Filed: Jul. 18, 2019

(86) PCT No.: PCT/EP2019/069382
§ 371 (c)(1),
(2) Date: Jan. 26, 2021

(87) PCT Pub. No.: WO2020/020743
PCT Pub. Date: Jan. 30, 2020

(65) Prior Publication Data
US 2021/0162821 A1   Jun. 3, 2021

(30) Foreign Application Priority Data

Jul. 27, 2018 (FR) .................................. 1856998

(51) Int. Cl.
*B60C 23/04* (2006.01)
*B60C 23/00* (2006.01)

(52) U.S. Cl.
CPC .......... *B60C 23/0479* (2013.01); *B60C 23/00* (2013.01)

(58) Field of Classification Search
CPC ........................... B60C 23/0479; B60C 23/00
See application file for complete search history.

(56) References Cited

U.S. PATENT DOCUMENTS

| 7,954,368 B2 * | 6/2011 | Leman | B60C 23/0416 73/146 |
| 8,344,869 B2 * | 1/2013 | Lickfelt | B60C 23/0442 340/442 |

(Continued)

FOREIGN PATENT DOCUMENTS

DE   102015105885 A1   10/2016

OTHER PUBLICATIONS

International Search Report and Written Opinion for International Application No. PCT/FP2019/069382, dated Oct. 16, 2019, 7 pages.

(Continued)

*Primary Examiner* — Tyler J Lee
(74) *Attorney, Agent, or Firm* — RatnerPrestia

(57) ABSTRACT

A method for adjusting the periodicity of wireless communications between a tire pressure monitoring system for a motor vehicle and a smart device for a user of the vehicle in question is disclosed. On the basis of the position and any movement of the user's smart device in the environment of the vehicle, the periodicity of the alternation, by the different units of the system, of phases of transmission/polling of ultra high frequency signals with standby phases is modified.

12 Claims, 3 Drawing Sheets

(56) References Cited

U.S. PATENT DOCUMENTS

| | | | |
|---|---|---|---|
| 9,120,357 B2* | 9/2015 | Deniau | B60C 23/0471 |
| 9,139,052 B2* | 9/2015 | Steiner | B60C 23/0416 |
| 9,475,348 B2* | 10/2016 | Hammer | B60C 23/0483 |
| 9,783,009 B2* | 10/2017 | Kessler | B60C 23/0408 |
| 10,252,583 B2* | 4/2019 | Kandler | B60C 23/0433 |
| 10,500,907 B2* | 12/2019 | Darrer | B60C 23/0433 |
| 10,821,788 B2* | 11/2020 | Van Wiemeersch | B60C 23/0406 |
| 2008/0117079 A1* | 5/2008 | Hassan | B60R 25/045 340/901 |
| 2009/0109012 A1* | 4/2009 | Petrucelli | G01L 17/00 340/445 |
| 2010/0207753 A1 | 8/2010 | Sugiura | |
| 2015/0239305 A1* | 8/2015 | Deniau | B60C 23/0479 340/442 |
| 2016/0096402 A1* | 4/2016 | Carlin | B60C 23/0479 340/442 |
| 2017/0040911 A1* | 2/2017 | Tatarchuk | H02K 11/0094 |
| 2017/0190225 A1* | 7/2017 | Yu | B60C 23/0483 |
| 2017/0225526 A1* | 8/2017 | Tomakidi | B60C 23/0471 |
| 2017/0263062 A1 | 9/2017 | Bergerhoff | |
| 2019/0084359 A1* | 3/2019 | Hassani | H04B 17/27 |
| 2019/0147209 A1* | 5/2019 | Hsu | G06K 7/10554 235/462.1 |
| 2019/0225034 A1* | 7/2019 | Van Wiemeersch | B60C 23/0455 |

OTHER PUBLICATIONS

International Search Report and Written Opinion for International Application No. PCT/EP2019/069382, dated Oct. 16, 2019, 11 pages (French).

English Translation of the Written Opinion for International Application No. PCT/EP2019/069382, dated Oct. 16, 2019, 5 pages.

* cited by examiner

OPTIMISATION OF WIRELESS COMMUNICATIONS OF A TYRE-PRESSURE-MONITORING SYSTEM FOR A MOTOR VEHICLE

CROSS REFERENCE TO RELATED APPLICATIONS

This application is the U.S. National Phase Application of PCT International Application No. PCT/EP2019/069382, filed Jul. 18, 2019, which claims priority to French Patent Application No. 1856998, filed Jul. 27, 2018, the contents of such applications being incorporated by reference herein.

FIELD OF THE INVENTION

The present invention relates in a general manner to tire pressure monitoring systems for motor vehicles.

More particularly, it relates to a method for optimizing the energy consumption associated with wireless communications between the different units forming such a system, on the one hand, and a smart device of a user of the vehicle equipped with this system, on the other hand.

BACKGROUND OF THE INVENTION

With a view to enhancing safety, an increasing number of motor vehicles are currently fitted with tire pressure monitoring systems. These systems, also called TPMS (for "Tire Pressure Monitoring Systems"), enable the user to be aware at all times of useful parameters such as the inflation pressure or the temperature of tires, by means of sensors installed at the wheels of the vehicle. If necessary, the vehicle driver can thus be warned of any situation relating to the state of the tires that may affect the vehicle driving conditions, or that may even create a risk for him and any passengers. Additionally, the information collected by these sensors can also be used by other on-board electronic systems in the vehicle for the performance of their specific functions.

A TPMS is conventionally made up of two parts. On the one hand, it comprises electronic modules, one of which is fitted in each wheel of the vehicle. These modules each incorporate at least an electronic circuit, a low frequency radio receiver (for receiving signals at a frequency of about 125 kHz) and high-frequency radio transmitter (for transmitting signals at a frequency of about 315 MHz or about 434 MHz), together with a battery to supply them with electricity. These modules, also referred to below as wheel units (or WU, for "Wheel Unit"), have the function of measuring the various operating parameters of the wheel as mentioned above, using sensors incorporated into their electronic circuits. A TPMS also comprises a central unit incorporating at least a high-frequency radio receiver receiving the signals emitted by the wheel units (also called radiofrequency or RF signals). The central unit is capable of distinguishing, analyzing and using the information that it receives in this way from each wheel unit.

Depending on the model used, the wheel units can be arranged inside a tire by being attached at the valve of the tire or on the inner face of its tread. In all cases, they regularly measure at least the pressure and temperature of the tire at this point. They transmit corresponding information periodically (typically about every 16 seconds) to the central unit, accompanied by a unique wheel identifier enabling the central unit to distinguish the individual wheel from which the received signals originate. The periodic nature and the frequency of these transmissions are directly related to the energy consumption constraints that must be met by the batteries incorporated in the wheel units. These batteries, which are subject to limitations in terms of cost and overall dimensions, must also enable the wheel unit to have a service life (that is to say, a period of use without requiring replacement) of about 10 years, notably in order to meet the expectations of customers and users.

As described above, up to the present time, communications between the wheel units and the central unit of a TPMS have essentially taken place by means of radiofrequency signals at specified frequencies of the order of several hundred megahertz (MHz).

Additionally, the presence of a radio receiver for low frequencies of the order of several hundreds of kilohertz (also referred to as an LF signal, for "Low Frequency"), in each wheel unit is used for diagnostic or configuration/training operations on the wheel unit concerned. An external tool can be used in a maintenance or repair workshop for configuring the functions or diagnosing the faults of a wheel unit, by sending it commands for this purpose using an LF signal.

The frequency bands of the signals described above, which are currently used by the wheel units of TPMS, provide means of wireless data exchange that are reliable, secure and relatively energy-saving. However, recent technological developments have highlighted the value of the potential use of signals in other, higher, frequency bands for communication with the wheel units, with the aim of offering other "experiences" to the user. In particular, the widespread use of portable communication devices for users, known as intelligent devices or "smart devices", such as smartphones, tablets and smart watches, using radio waves at ultra high frequency (UHF), that is to say at frequencies of more than a gigahertz (WiFi, Bluetooth®, 4G, . . . ), opens the way to very promising advanced functionality. This makes it possible to use TPMS to offer a greater capacity for interaction with the user, notably by using two-way communications that can be established between said smart devices and some or all of the wheel units of a TPMS.

Thus, for example, it would be simple for the user of a vehicle to know the pressure of each tire in real time, that is to say even when he is not in his vehicle, and to be warned of the critical deflation of a tire well before the moment when he accesses his vehicle to use it. In this way the user would be spared the disagreeable experience of finding a flat tire just when he wished to make a journey in his vehicle. Thus he could make the necessary repair in advance, and/or take other action so as to be able to travel and avoid missing an appointment, for example.

Moreover, the user could also access his car without a key (referred to as "hands free" access), directly by using his smartphone to communicate with the vehicle for this purpose, using the communication means of the TPMS. In particular, such a functionality would be based on the authentication and location of a user's smartphone, via his exchanges with the wheel units of the TPMS.

Finally, by using UHF radio waves at frequencies allowing communication between a smart device and the units of a TPMS, it would be possible, for the existing functionality, to avoid the use of a special interface of the vehicle (whether visual or audio) for communicating useful information to the user on his smartphone. Furthermore, it would also permit new functionality, based on direct interactivity between this user's smart device and the vehicle.

To sum up, the use of UHF radio waves at frequencies of the order of a gigahertz to exchange wireless data with the wheel units of a TPMS would thus lead to an enhanced "user experience". Finally, the type of signal used to establish such wireless communication could be chosen so as to offer both sufficiently strong security guarantees (in view of legal requirements) and a range suitable for the data exchanges in question.

US patent application 2017/0263062 A1, incorporated by reference, proposes the use of communications based on UHF radio waves at the frequency of 2.4 GHz, in this case a Bluetooth® signal, between a smartphone and an on-board transceiver in a motor vehicle to allow "hands free" access and keyless starting of the vehicle. However, the transceiver is a dedicated entity, resulting in an additional cost. Being separate from the TPMS units, it cannot directly retrieve information from the wheels about the state of the tires and communicate this to the user.

An approach that may be envisaged is that of using transceivers for UHF signals at a frequency of more than a gigahertz, directly implanted into the units of a TPMS. This approach has, for example, already become feasible with the use of a low-consumption Bluetooth® signal at 2.4 GHz, also referred to as a BLE (for "Bluetooth Low Energy") signal. This makes it possible, in the first place, to transmit relevant information on the state of the tires, obtained from measurements of the wheel unit sensors, directly to the user on his smart device. It also makes it possible, by using the capacity of the wheel units to detect such signals in their environment, to precisely locate a user, and if necessary to know his movement in this environment (in other words, in the immediate environment, around the vehicle itself). Such location has proved useful for providing a reactive and efficient function of "hands free" access to the vehicle, for example by making it possible to detect the side from which the user is approaching the vehicle, and to perform actions as a result. Finally, the incorporation of UHF transceivers for such signals into the wheel units and/or into the central unit of a TPMS forms part of an overall aim of development toward future systems that are functionally richer. This is because UHF radio signals can be used both for inter-unit communications within TPMS and for carrying out the configuration or diagnosis of the systems, or for other, future functions that are, or will be, specific to the function of the TPMS.

However, in the present state of the art, this approach is subject to a major limitation on its effective implementation, namely the high energy consumption that is potentially intrinsic to this type of communication. This is because, regardless of the type of signal used at these frequencies, the data exchanges that they provide entail very short reaction times for asynchronous events. In other words, the communication is inevitably based on exchanges that are very frequent, and therefore costly in terms of energy. As mentioned in the introduction, the imperatives of limited energy consumption, together with the specified service life objectives for wheel units, have inevitably ruled out this type of solution hitherto.

This disadvantage would be reduced by the use of BLE signals, for which the exchange frequency can be better controlled (so that it is not always high), in order to limit the electricity consumption. Moreover, their limited range would reduce the risks of interference with signals from other vehicles, and would also limit the security risks associated, notably, with the possible interception of signals by malicious third parties. Finally, the establishment of communications between the user's smart device and the TPMS by means of a BLE signal could be fast, automatic and highly efficient. However, even for this type of "low-consumption" protocol, the energy consumption remains much too high to allow their use for wheel units without a considerable reduction in endurance. Typically, based on the use of such signals for conventional two-way communication with a user's smart device, the endurance of wheel units would probably be less than 6 months, as against 10 years for existing solutions.

SUMMARY OF THE INVENTION

An aspect of the invention is aimed at removing, or at least attenuating, all or some of the aforementioned drawbacks of the prior art.

For this purpose, a first aspect of the invention proposes a method for adjusting the reaction time of wireless communications between a tire pressure monitoring system of a motor vehicle and a smart device of a user of said motor vehicle, said tire pressure monitoring system comprising a plurality of units including a central unit and a plurality of wheel units, said communications taking place between said units of said tire pressure monitoring system and said smart device by means of ultra high frequency signals in which, in a given period, phases allowing the activation of two-way communications alternate with standby phases, said method comprising:

when the smart device is located in a first area of the environment of the vehicle and approaches the vehicle, the central unit control signal sets the period of wireless communications between the wheel units of the tire pressure monitoring system and the smart device to a first value;

when the smart device is located in a second area of the environment of the vehicle, nearer to the vehicle than the first area, the central unit control signal establishes a connection using continuous wireless communications between said central unit and the smart device;

if the smart device is moving in the second area, the central unit sets the period of wireless communications between the wheel units of the tire pressure monitoring system and the smart device to a second given value, greater than the first given value; or, if the smart device is stationary in the second area for a period that exceeds a specified threshold, the central unit causes the wheel units of the tire pressure monitoring system to switch to a standby phase only.

Other embodiments, considered individually or in combination, also provide that:

the first area is an area covered by a network using ultra high frequency (UHF) radio waves, with a frequency exceeding 1 GHz, said network being, for example, a Wifi or 4G network;

the second area is an area covered by the range of ultra high frequency (UHF) radio waves, having a frequency of more than 1 GHz, sent from the units of the system, said range corresponding, for example, to the range of a Bluetooth® or Bluetooth® Low Energy (BLE) signal from said units of the tire pressure monitoring system;

when the smart device is located in a first area of the environment of the vehicle, the method further comprises the collecting and updating by the central unit of information relating to the tires received from the wheel units and the transmission of this information to the smart device;

when the smart device is located in a first area of the environment of the vehicle, the central unit also uses information concerning the habits of the user of the vehicle associated with the smart device, stored in a memory of a unit of the tire pressure monitoring system, to initiate the setting of the period of the wireless communications between the wheel units of the tire pressure monitoring system and the smart device to a first given value;

the first value of the wireless communications period is between 1 and 5 seconds;

the second value of the wireless communications period is between 20 and 200 seconds;

the position and the movement of the smart device in the first and second areas are determined by the units of the tire pressure monitoring system, for example by using its GPS coordinates, determined by a device incorporated in the smart device, by measuring the power of the signal received by the central unit, or by using at least one accelerometer incorporated into the smart device;

the information concerning the distance between the vehicle and the smart device and/or the movement of the smart device is determined by the central unit and is retrieved by a computing cloud, which controls the central unit on the basis of said information;

the smart device is included in the set comprising a smartphone, a tablet and a smart watch.

In a second aspect, the invention also proposes a central unit of a tire pressure monitoring system of a motor vehicle, said tire pressure monitoring system comprising a plurality of units including said central unit and a plurality of wheel units, said communication taking place between said units of said tire pressure monitoring system and said smart device by means of ultra high frequency signals in which, in a given period, transmission phases alternate with standby phases, said central unit comprising means for implementing all the steps according to any of the embodiments of the first aspect of the invention.

In a third aspect, the invention also proposes a motor vehicle driver-assistance system comprising a central unit of a tire monitoring system of a motor vehicle conforming to the central unit according to the second aspect of the invention, capable of implementing all the steps of the method according to any of the embodiments of the first aspect of the invention.

BRIEF DESCRIPTION OF THE DRAWINGS

Other characteristics and advantages of aspects of the invention will become more apparent upon reading the following description. This description is purely illustrative and should be read with reference to the appended drawings, in which.

DETAILED DESCRIPTION OF THE PREFERRED EMBODIMENTS

Figure 1:
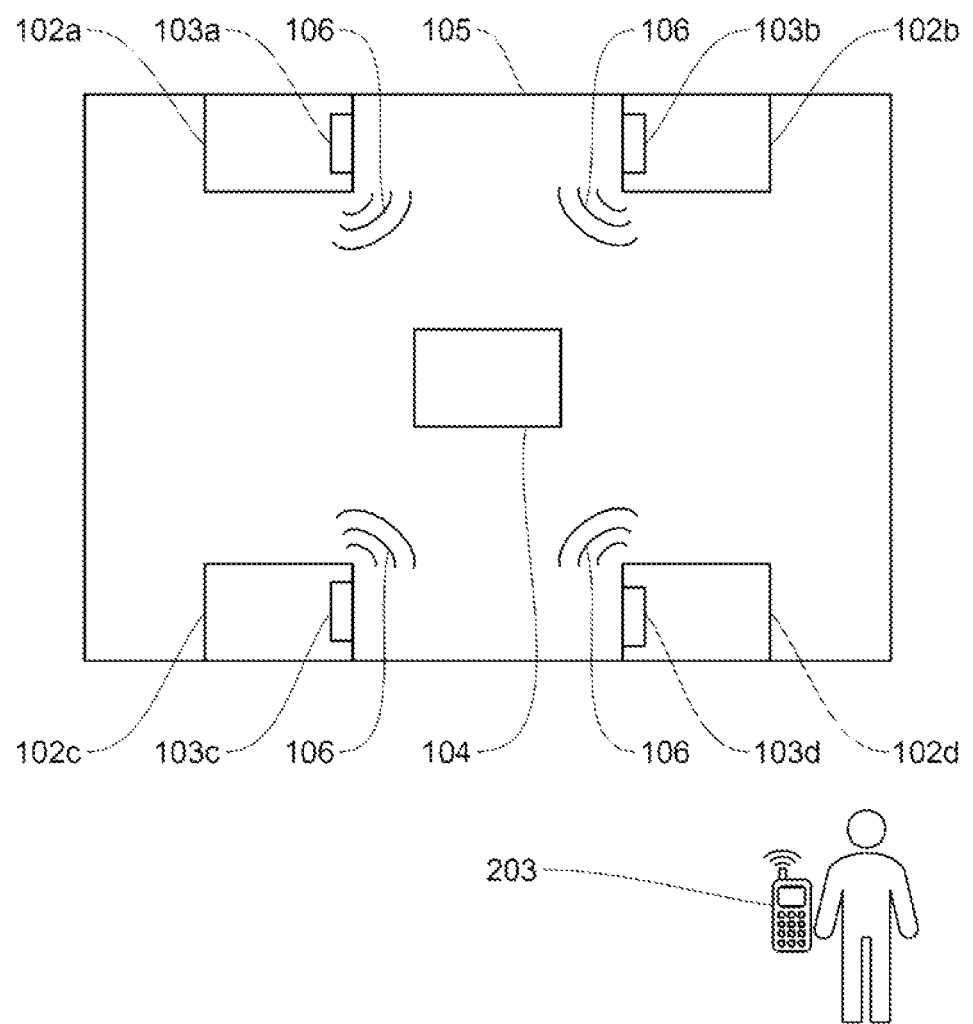
FIG. 1 is a schematic representation of a tire pressure monitoring system of a motor vehicle.

In the following description of the embodiments and in the figures of the attached drawings, the same or similar elements have the same numerical reference signs in the drawings.

FIG. 1 is a schematic representation of a tire pressure monitoring system (TPMS) in which embodiments of the method may be implemented.

The tire pressure monitoring system 101 comprises a set of wheel units, for example four such units 103a-103d, mounted on the four wheels, 102a-102d respectively, of a motor vehicle 105. As described above, these wheel units 103a-103d regularly carry out the measurement of various operating parameters of the corresponding wheels, including the inflation pressure and the temperature inside the tire. According to embodiments, they transmit the results of these measurements, using a signal 106 carried by UHF radio waves (also referred to below as a UHF signal), to the central unit 104. The signal is, for example, a Bluetooth® Low Energy (BLE) signal.

Those skilled in the art will understand that the central unit 104 of the TPMS 101 may form an integral part of a centralized electronic calculation unit within the vehicle 105 (known as an ECU, for "Electronic Control Unit", or a BCM, for "Body Controller Module"), or alternatively may be a separate electronic entity. Additionally, any type of wireless signal, in an ultra high frequency band located above one gigahertz and permitting two-way communication, could also be used by the units of the TPMS for communication.

The wheel units 103a-103d are stand-alone electronic modules, fitted in the wheels, which each contain at least an electronic circuit, a UHF radio wave transceiver, and a battery. The mounting of these wheel units in the wheel does not necessarily differ from that known from the prior art, and can therefore be carried out inside each tire, for example at the position of the tire's valve, or on the inner face of its tread.

Additionally, the electronic circuit or integrated circuit (or ASIC, for "Application Specific Integrated Circuit") fitted to each wheel unit 103a-103d incorporates at least one microprocessor and various memories. These memories, permanent or volatile, store, notably, the operating software of the wheel unit 103a-103d and data obtained from measurements made by sensors. Finally, the electronic circuit incorporates the different sensors for carrying out the measurements made by the wheel unit 103a-103d. It may, for example, incorporate an accelerometer, a pressure sensor, a temperature sensor and other electronic measurement devices. It is by means of these sensors and other associated devices that a wheel unit 103a-103d can obtain data for directly or indirectly determining, for example, the speed of the vehicle 105, the acceleration of the vehicle 105, the temperature at the tire, the inflation pressure of the tire, etc.

The known functions of such a TPMS, namely the measurement of the pressure and temperature of the tires, may therefore be performed in a conventional manner. Advantageously, the information deduced from these measurements may be transmitted directly to the smart device 203 of a user of the vehicle 105 via UHF radio waves whose frequency exceeds one gigahertz. Additionally, other functions, such as the spatial location of the smart device 203 of the user (the potential driver) and his "hands free" access to the vehicle 105 by means of said smart device 203, may also be performed by means of the measurements made by the units of the TPMS which are based on the use of the UHF signal.

The method according to an aspect of the invention, embodiments of which are described below, makes it possible to limit the energy consumption resulting from the use of this type of signal by the wheel units of the TPMS.

Figure 2:
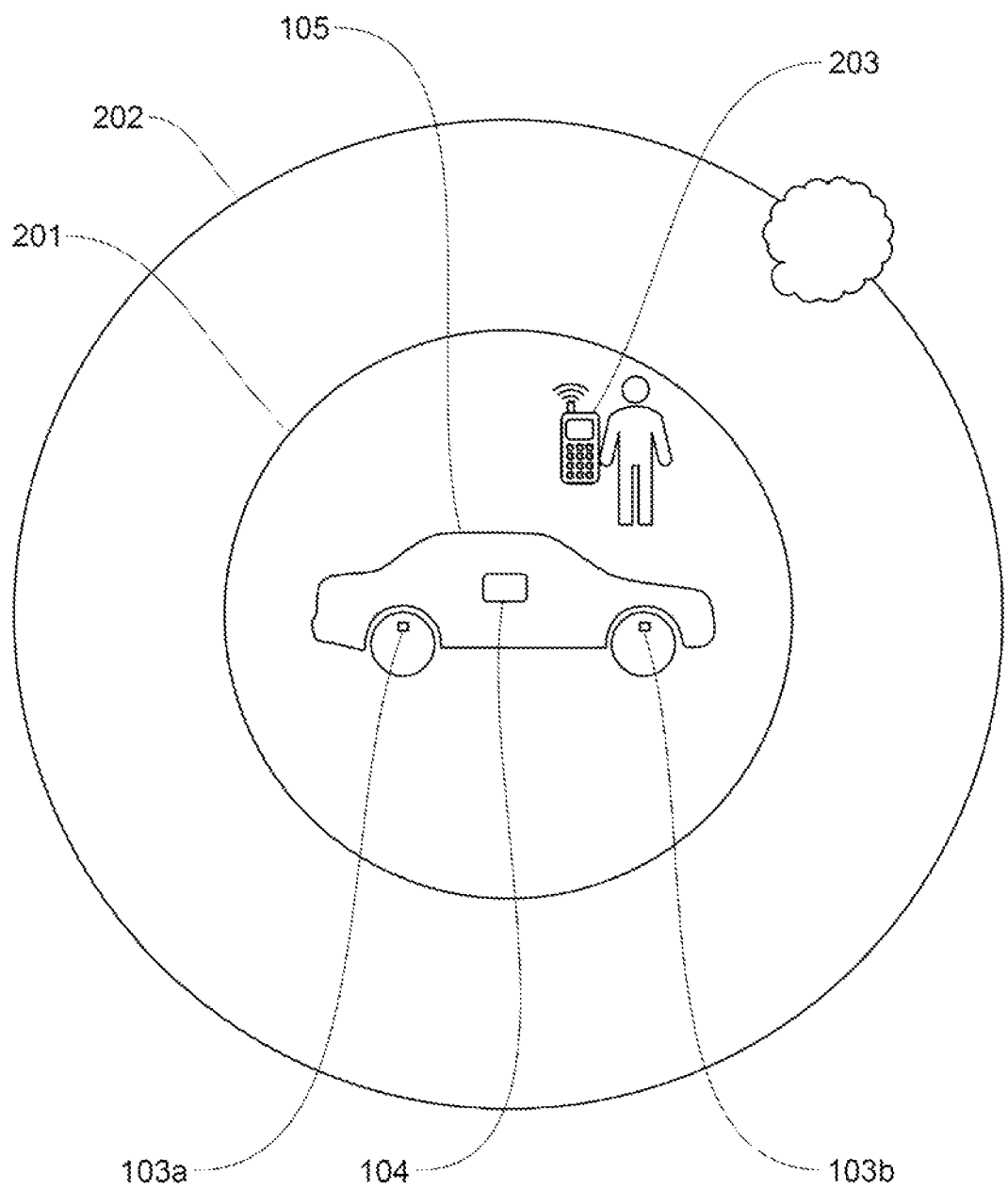
FIG. 2 is a schematic representation of a context of implementation of the method according to an aspect of the invention.

FIG. 2 shows schematically an example of a context of use of the method according to an aspect of the invention.

The motor vehicle 105 is equipped with a TPMS, according to the tire monitoring system 101 described with reference to FIG. 1, of which three units, namely two wheel units 103a and 103b and the central unit 104, are represented and visible in the figure.

Using the transceivers fitted to the wheel units 103a-103d (as described above with reference to FIG. 1), direct communications via UHF signals can therefore be established between the smart device 203 of a user of the vehicle 105 and these wheel units 103a-103d. As will be more readily apparent from the remainder of the description, the aim of the method is to adapt the periodicity of these communications.

The terms "communication" and "communications" are here taken to mean the sending by a wheel unit 103a-103d of a message carried by a UHF signal, and the reception by said wheel unit 103a-103d, if appropriate, of any message sent in response by the smart device 203, also carried by a UHF signal.

"Smart device" is here taken to mean any portable and communicating user device, having at least some computing capacity, a user interface, and means of wireless communication by UHF signals. It may, for example, be a smartphone, a tablet or a smart watch that can establish a WiFi, Bluetooth®, Bluetooth® Low Energy, or 4G connection, for example. These examples are not limiting.

Depending on the embodiments, the modification of the periodicity of these communications is, notably, carried out on the basis of the location of the smart device 203 in the environment of the vehicle 105. In the figure, the smart device 203 is shown only in the second area 201, corresponding to the immediate proximity of the vehicle 105. However, depending on whether the smart device 203 is located in the second area 201 or in the first area 202 which correspond to the environment a little farther from the vehicle 105, the periodicity of its exchanges with the wheel units can be modified. Additionally, the initiation of these modifications may also take into account, if necessary, the movement or the absence of movement of the smart device 203 in or between these areas. An aspect of the invention is not limited by the number of areas taken into account, which may or may not be concentric rings around the vehicle 105 like the areas shown in FIG. 2. They may, for example, be areas corresponding to the four quadrants around the vehicle 105, or front and rear areas, or alternatively left and right areas on each side of the vehicle 105.

In one embodiment of the method, the second area 201 represents an area covered by the range of a short-range UHF signal, for example a BLE signal, sent from the transceivers of the set of TPMS units. The first area 202 represents the area of coverage of a UHF signal, for example a WiFi signal, covering a spatial area much larger than the second area 201. In practice, in the case of the coverage of a public WiFi network for example, those skilled in the art will understand that the first area 202 may have no given spatial limit, since the network may cover what are considered to be "infinite" dimensions with respect to the potential movements of the smart device 203 of a user (being limited only by the network coverage of the smart device 203).

As is known to those skilled in the art, the type of short-range UHF signal used (a BLE signal, for example), in the context of an aspect of the invention, by the transceiver means of both the smart device 203 and the wheel units 103a-103d for communication may require three distinct communication modes:

the mode known as "transmission" mode, in which the messages are sent only in a unidirectional manner by a transmitting entity, for example a wheel unit 103a-103d, no message being expected in return;

the mode known as "exchange" mode, in which an entity concerned periodically generates:
  on the one hand, short phases for the activation of two-way communication, including the transmission of signals and listening/polling, which may be propagated in its environment and intended for it.
  on the other hand, longer standby phases in which the communication means are inactivated in order to limit energy consumption.

The reception by this entity, during its listening/polling phase, of any "response" signal from another entity present in its environment (i.e. a signal sent by a known smart device 203 in response to the signal sent by the wheel unit 103a-103d during the phase that permits activation) is a preliminary to the establishment of a connection; and the mode known as "connected" mode, in which two-way data exchanges take place continually at high speed between the two entities involved in the connection. In this case the energy consumption is maximal.

The aim of the method, according to the embodiments of the present invention as described below, is to adjust the periods of the exchanges that take place, via this type of UHF signal, particularly in the "exchange" mode (i.e. the periods of the phases permitting the activation of two-way communication), between the TPMS units of a vehicle 105 and the smart device 203 of its user (or of one of its users), for example according to its position and possible movement in the environment of the vehicle 105. This is done in order to reduce the energy consumption entailed by the use of this type of signal, and thus to allow the effective implementation of transceivers using this type of UHF signal in the wheel units 103a-103d of a TPMS.

Figure 3:
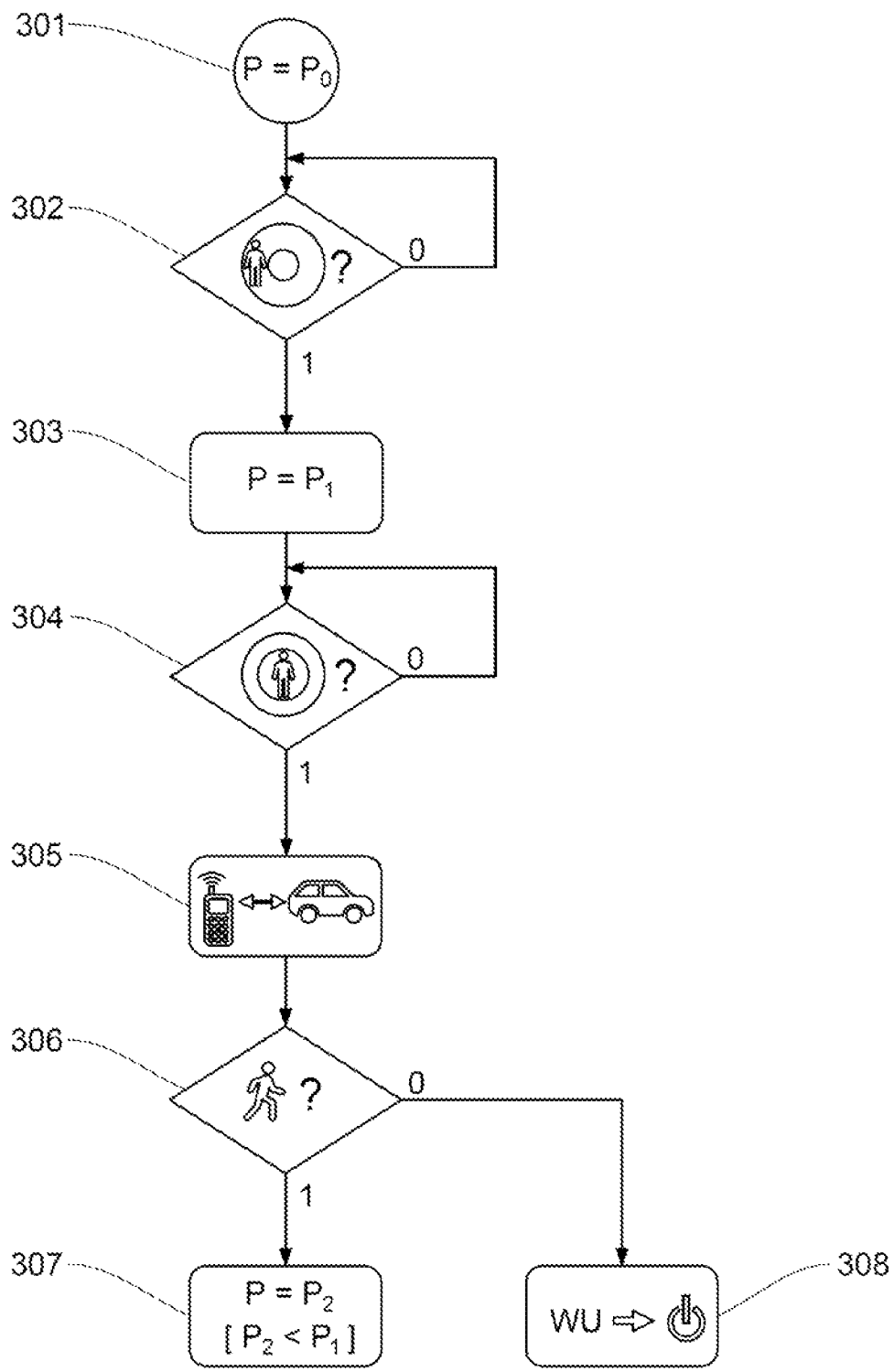
FIG. 3 is a diagram of steps of an embodiment of the method according to an aspect of the invention.

An embodiment of the method according to the invention will now be described with reference to the diagram of steps in FIG. 3.

As stated above, the method relates to the modification of the periods of the phases permitting activation of the two-way communication involving exchanges between the units of the system and the smart devices 203 known to the system (for example, the smart devices 203 belonging to the regular users of the vehicle 105), in the monitoring mode. For example, for units equipped with BLE signal transceivers, the periodicity of the transmission phases of the unit, in "exchange" mode, may vary between 7.5 milliseconds (ms) at the most frequent and 10.4 seconds (s) at the least frequent. This implies a significant variation in energy consumption, which is advantageous, particularly for the wheel units 103a-103d which are supplied by independent batteries with a finite energy reserve.

In the initial situation 301, the user's smart device 203 communicates with the TPMS units in a period $P_0$. For example, in an initial configuration where the user is very remote from the vehicle 105, this period may be the longest period that can be achieved for the type of signal used, in order to save the energy of the wheel units 103a-103d. Typically, this is a period of 10.4 seconds for a BLE signal.

Step 302 then consists in determining whether the user's smart device 203 is located in the first area 202 of FIG. 2, and whether he is approaching the vehicle 105. If this is not the case, no specific action is taken. In particular, the period of the wireless transmissions from the wheel units 103a-103d of the tire pressure monitoring system 101 to the smart device 203 is not modified.

However, if the user has entered the first area 202 and is approaching the vehicle 105, then, in step 303, the central unit 104 causes the period of the communications between the TPMS units and with the smart device 203 to be modified to a specified value $P_1$. For example, if a user who is very remote from the vehicle 105 has started to approach it inside the first area 202 without necessarily entering the second area 201, the period of the communications may change from its maximum value $P_0$ to its value $P_1$, which in this case will be lower than $P_0$. Such a change of period, for example a reduction of several seconds or even more, makes it possible to anticipate a possible connection and act in such a way that it can be established more rapidly if necessary.

Additionally, in a specific embodiment, if the test in step 302 is positive, the central unit 104 can update the information obtained from the sensors of the wheel units 103a-103d and send it to the user's smart device 203, for example in order to notify him that a tire is deflated, if necessary, before the user gets into the vehicle 105. These exchanges with the smart device 203 are carried out from the central unit 104, thereby saving the batteries of the wheel units 103a-103d.

Those skilled in the art will understand that the distance between the smart device 203 and the vehicle 105 and/or the movement of the user's smart device 203 may be determined from their respective instantaneous GPS coordinates (known to the central unit 104 and the smart device 203, at least), or alternatively by using an accelerometer fitted in the smart device 203 (if it is only a movement that is to be detected). These data are then retrieved by the central unit 104, for example, via exchanges with a "computing cloud" (that is to say a set of hardware, network connections and software) of the network covering the second area 201, or via exchanges using a 4G wireless signal, for example.

Additionally, in an embodiment where a computing cloud is involved in the exchange between the central unit 104 and the smart device 203, the various steps of the method may be controlled at the level of this computing cloud. In this case, the computing cloud may control the period of the communications via the central unit 104 on the basis of the information retrieved from the central unit 104 and the smart device 203.

A variant in step 302 is that of considering, in place of the distance between the user and the vehicle 105, the hourly routines of the user. Thus a preliminary learning phase may make it possible to know and store, in the TPMS, the user's customary time of departure from his home or place of work, for example, and thus initiate the modification of the periodicity of the communications automatically on the basis of this information, in order to increase the periodicity only during the time slots when it is most likely that the user will wish to access the vehicle 105.

Step 304 consists in determining whether or not the user's smart device 203 is located in the second area 201 in the immediate proximity of the vehicle 105. If this is not the case, no specific action is taken.

However, if it is the case, at the end of step 304 the central unit 104 (and only the central unit 104) switches, in step 305, to the connected mode with the smart device 203, while controlling the periodicity of the communications between the wheel units 103a-103d and the smart device 203 in different ways, depending on circumstances.

Step 306 then makes it possible to determine whether or not the smart device 203 is moving around the vehicle 105. It will be recalled that the second area 201 corresponds, for example, to an area covered by the ultra high frequency signal transmitted/received from the TPMS units (typically a BLE signal), and that, in this type of use, the distance between the smart device 203 and the units (and therefore the movement of the smart device 203) may, notably, be determined via a radio power level measurement based on an indicator of the RSSI type (for "Received Signal Strength Indicator"). This measurement of the power of the received signal is representative of the distance between two transmitting and receiving entities (assuming free-field propagation). The variation of the RSSI beyond a specified threshold (regardless of whether it is an increase or a decrease) represents a movement by the user (approaching or withdrawing, respectively).

If it is determined in step 306 that the smart device 203 is moving in the second area 201 (outside the vehicle 105), then in step 307 the central unit 104 causes the period of the wireless communications between the units of the tire pressure monitoring system 101 and with the smart device 203 to be modified to a period value $P_2$ which is much lower than the value $P_1$ set in step 302. Since the establishment of the connection to the smart device 203 is considered to be imminent, the value assigned to this period may be, for example, several tens to several hundreds of milliseconds only. Thus the wheel unit 103a-103d will react more quickly to the approach of the user of the vehicle 105.

In one embodiment, however, in order to avoid unjustified excess consumption, the central unit 104 may put the wheel units 103a-103d into a standby phase, in step 308, as soon as the smart device 203 remains relatively stationary in the second area 201 (i.e. no movement is detected) for a certain period, without entering the vehicle 105. Thus, if the user happens to be, for example, relatively stationary in his house but near his garage where the vehicle is, so that he is in the second area 201 (corresponding to the range of the UHF signal used by the TPMS units) but does not enter his garage, then practically no power will be drawn from the battery of the wheel units 103a-103d. Starting from this situation, as soon as a movement of the smart device 203 is again detected in the area concerned, the central unit 104 can cause the wheel units 103a-103d to exit the standby phase, with a specified communication period such as that described above.

Finally, the method therefore makes it possible to adjust the periodicity of the wireless communications of the units 104, 103a-103d, and notably of the wheel units 103a-103d of the TPMS, with the smart device 203, in order to optimize/minimize the energy consumption due to these communications, while ensuring good reactivity of the exchanges for the various functions offered by the TPMS units. Whether it is for the purpose of transmitting information to the user about the tires of his vehicle 105 via his smart device 203, or for providing the user with "hands free" access to his vehicle 105, the method therefore makes it possible to consume only the energy that is really essential for the good reactivity of this functionality.

An aspect of the present invention has been described and illustrated, in the present detailed description and in the figures of the attached drawings, in possible embodiments. However, an aspect of the present invention is not limited to the embodiments described. Other variants and embodiments may be deduced and implemented by a person skilled in the art after reading the present description and studying the appended drawings.

In the claims, the term "comprise" or "include" does not exclude other elements or steps. A single processor or several other units can be used to implement an aspect of the invention. The various features described and/or claimed can advantageously be combined. Their presence in the description or in different dependent claims does not exclude the possibility of combining them. The reference signs should not be understood as limiting the scope of aspects of the invention.

The invention claimed is:

1. A method for adjusting the reaction time of wireless communications between a tire pressure monitoring system of a motor vehicle and a smart device of a user of said motor vehicle, said tire pressure monitoring system comprising a plurality of units including a central unit and a plurality of wheel units, said communications taking place between said units of said tire pressure monitoring system and said smart device by means of ultra high frequency signals in which, in a given period, phases permitting the activation of two-way communications alternate with standby phases, said method comprising:

when the smart device is located in a first area of the environment of the vehicle and approaches the vehicle, the central unit sets the period of wireless communications between the units of the tire pressure monitoring system and with the smart device to a first given value;

when the smart device is located in a second area of the environment of the vehicle, nearer to the vehicle than the first area, the central unit establishes a connection using two-way wireless communications between said central unit and the smart device, and:

if the smart device is moving in the second area, the central unit sets the period of wireless communications between the wheel units of the tire pressure monitoring system and the smart device to a second given value, lower than the first given value; or if the smart device is stationary in the second area for a period that exceeds a specified threshold, the central unit causes the wheel units of the tire pressure monitoring system to switch to a standby phase only.

2. The method as claimed in claim 1, wherein the first area is an area covered by a network using ultra high frequency radio waves, with a frequency exceeding 1 gigahertz, said network being a Wifi or 4G network.

3. The method as claimed in claim 1, wherein the second area is an area covered by the range of ultra high frequency radio waves, having a frequency of more than 1 GHz, from the units of the tire pressure monitoring system, said range corresponding to the range of a Bluetooth® or Bluetooth® Low Energy signal from said units of the tire pressure monitoring system.

4. The method as claimed in claim 1, wherein, when the smart device is located in a first area of the environment of the vehicle, the method further comprises the collecting and updating by the central unit of information relating to the tires received from the wheel units and the transmission of this information to the smart device.

5. The method as claimed in claim 1, wherein, when the smart device is located in the first area of the environment of the vehicle, the central unit also uses information concerning the habits of the user of the vehicle associated with the smart device, stored in a memory of a unit of the tire pressure monitoring system, to initiate the setting of the period of the wireless communications between the wheel units of the tire pressure monitoring system and the smart device to a first given value.

6. The method as claimed in claim 1, wherein the first value of the wireless communications period is between 1 and 5 seconds.

7. The method as claimed in claim 1, wherein the second value of the wireless communications period is between 20 and 200 milliseconds.

8. The method as claimed in claim 1, wherein the distance between the vehicle and the smart device and/or the movement of the smart device, in the first and second areas, are determined by the central unit of the tire pressure monitoring system, for example by using the GPS coordinates of the central unit and of the smart device, by measuring the power of the signal transmitted by the smart device and received by the central unit, or by using at least one accelerometer incorporated into the smart device.

9. The method as claimed in claim 8, wherein information concerning the distance between the vehicle and the smart device and/or the movement of the smart device is determined by the central unit and is retrieved by a computing cloud, which controls the central unit on the basis of said information.

10. The method as claimed in claim 1, wherein the smart device is included in the set comprising a smartphone, a tablet and a smart watch.

11. A central unit of a tire pressure monitoring system of a motor vehicle, said tire pressure monitoring system comprising a plurality of units including said central unit and a plurality of wheel units, said communication taking place between said units of said tire pressure monitoring system and said smart device by ultra high frequency signals in which, in a given period, transmission phases alternate with standby phases, said central unit comprising means for implementing all the steps of the method as claimed in claim 1.

12. A motor vehicle driver-assistance system comprising a central unit of a tire monitoring system of a motor vehicle according to the central unit as claimed in claim 11.

* * * * *